(12) United States Patent
Taylor, II et al.

(10) Patent No.: US 10,812,815 B2
(45) Date of Patent: Oct. 20, 2020

(54) METHODS, SYSTEMS, AND COMPUTER READABLE MEDIA FOR COMPRESSING VIDEO IMAGES

(71) Applicant: The University of North Carolina at Chapel Hill, Chapel Hill, NC (US)

(72) Inventors: Russell Morton Taylor, II, Pittsboro, NC (US); Chong Shao, Chapel Hill, NC (US); Zhigang Zhong, San Jose, CA (US); Ketan Dasharath Mayer-Patel, Durham, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 73 days.

(21) Appl. No.: 15/506,725

(22) PCT Filed: Aug. 28, 2015

(86) PCT No.: PCT/US2015/047433
§ 371 (c)(1),
(2) Date: Feb. 24, 2017

(87) PCT Pub. No.: WO2016/033463
PCT Pub. Date: Mar. 3, 2016

(65) Prior Publication Data
US 2017/0244976 A1 Aug. 24, 2017

Related U.S. Application Data
(60) Provisional application No. 62/044,152, filed on Aug. 29, 2014.

(51) Int. Cl.
*H04N 19/196* (2014.01)
*H04N 19/23* (2014.01)
*H04N 19/182* (2014.01)
*G06T 7/194* (2017.01)
*G06T 7/11* (2017.01)
(Continued)

(52) U.S. Cl.
CPC .......... *H04N 19/198* (2014.11); *G06T 5/002* (2013.01); *G06T 7/11* (2017.01); *G06T 7/194* (2017.01);
(Continued)

(58) Field of Classification Search
CPC .... H04N 19/198; H04N 19/23; H04N 19/182; H04N 19/57; G06T 7/11; G06T 7/194
See application file for complete search history.

(56) References Cited

U.S. PATENT DOCUMENTS 5,768,438 A 6/1998 Etoh
7,466,842 B2 * 12/2008 Tuzel ................. G06K 9/00711
348/155

(Continued)

OTHER PUBLICATIONS

"Overview of JPEG 2000," Official JPEG 2000, https://jpeg.org/jpeg2000/, pp. 1-6 (accessed May 17, 2017).
(Continued)

*Primary Examiner* — Christopher S Kelley
*Assistant Examiner* — Boubacar Abdou Tchoussou
(74) *Attorney, Agent, or Firm* — Jenkins, Wilson, Taylor & Hunt, P.A.

(57) ABSTRACT

According to one exemplary method, the method includes classifying image pixels in each video image of a series of video images as either foreground or background. The method also includes replacing each pixel classified as background with a time-averaged value of pixel intensity for that pixel. The method further includes compressing the video images using a compression algorithm.

26 Claims, 8 Drawing Sheets

(51) Int. Cl.
*H04N 19/57* (2014.01)
*H04N 19/137* (2014.01)
*G06T 5/00* (2006.01)
*H04N 19/117* (2014.01)

(52) U.S. Cl.
CPC ............ *H04N 19/182* (2014.11); *H04N 19/23* (2014.11); *H04N 19/57* (2014.11); *G06T 2207/10016* (2013.01); *H04N 19/117* (2014.11); *H04N 19/137* (2014.11)

(56) References Cited

U.S. PATENT DOCUMENTS

| | | | | |
|---|---|---|---|---|
| 8,270,716 | B2* | 9/2012 | Fujimoto | H04N 19/23 382/176 |
| 8,280,160 | B2* | 10/2012 | Matsuoka | H04N 1/56 382/164 |
| 8,384,952 | B2* | 2/2013 | Hayasaki | H04N 1/644 345/555 |
| 8,417,034 | B2* | 4/2013 | Kim | G06K 9/38 382/173 |
| 8,908,967 | B2* | 12/2014 | Noh | G06K 9/64 382/171 |
| 9,070,004 | B2* | 6/2015 | Liu | G06K 9/0014 |
| 9,286,537 | B2* | 3/2016 | Radha Krishna Rao | G06K 9/4604 |
| 9,501,701 | B2* | 11/2016 | Wood | G06K 9/00711 |
| 9,584,814 | B2* | 2/2017 | Socek | G06T 7/11 |
| 2003/0108238 | A1 | 6/2003 | Xu | |
| 2005/0286764 | A1* | 12/2005 | Mittal | G06K 9/00771 382/181 |
| 2006/0098851 | A1* | 5/2006 | Shoham | A61B 17/1703 382/128 |
| 2006/0262959 | A1* | 11/2006 | Tuzel | G06K 9/00711 382/103 |
| 2007/0206865 | A1* | 9/2007 | Boregowda | G06K 9/00771 382/225 |
| 2008/0253689 | A1* | 10/2008 | Ferguson | H04N 17/00 382/294 |
| 2009/0141048 | A1* | 6/2009 | Fujimoto | H04N 19/17 345/673 |
| 2009/0323089 | A1* | 12/2009 | Hayasaki | H04N 1/642 358/1.9 |
| 2010/0158372 | A1* | 6/2010 | Kim | G06K 9/38 382/171 |
| 2010/0183223 | A1* | 7/2010 | Matsuoka | H04N 1/56 382/166 |
| 2012/0045090 | A1* | 2/2012 | Bobbitt | G06K 9/00771 382/103 |
| 2013/0071003 | A1* | 3/2013 | Wirtz | G06K 9/00127 382/133 |
| 2013/0243322 | A1* | 9/2013 | Noh | G06K 9/64 382/171 |
| 2013/0294675 | A1* | 11/2013 | Liu | G06K 9/0014 382/133 |
| 2014/0210951 | A1* | 7/2014 | Cho | H04N 13/271 348/49 |
| 2015/0071541 | A1* | 3/2015 | Qutub | G06T 7/187 382/173 |
| 2015/0206022 | A1* | 7/2015 | Radha Krishna Rao | G06K 9/4604 382/128 |
| 2015/0220789 | A1* | 8/2015 | Wood | G06K 9/00711 382/103 |
| 2015/0334398 | A1* | 11/2015 | Socek | G06T 7/11 375/240.26 |
| 2018/0220114 | A1* | 8/2018 | Ouchi | H04N 9/3185 |

OTHER PUBLICATIONS

"SVM: Weighted Samples", Scikit Learn, pp. 1-2 (accessed May 17, 2017, Publication dated unknown).
"Video Spot Tracker Version 05.23," CISMM Video Spot Tracker, accessed from wayback machine, https://web.archive.org/web/20161111102817/http://www.cs.unc.edu/~nanowork/cismm/downloads/spottracker/video_spot_tracker.html, pp. 1-19 (Nov. 11, 2016).
Amer et al., "Fast and Reliable Structure-Oriented Video Noise Estimation," IEEE Transactions on Circuits and Systems for Video Technology, vol. 15, No. 1, pp. 113-118 (2005).
Avinash, "Image Compression and Data Integrity in Confocal Microscopy," Scanning, vol. 17, pp. 156-160 (1995).
Bernas et al., "Compression of Fluorescence Microscopy Images Based on the Signal-to-Noise Estimation," Microsc. Res. Tech., vol. 69, pp. 1-9 (2006).
Burrows et al., "A Block-sorting Lossless Data Compression Algorithm," Technical Report 124, Digital Equipment Corporation, pp. 1-18 (May 10, 1994).
Christopoulos et al., "The JPEG2000 Still Image Coding System: An Overview", Consumer Electronics, IEEE Transactions, vol. 46, No. 4, pp. 1103-1127 (Nov. 2000).
Coates et al., "An Analysis of Single-Layer Networks in Unsupervised Feature Learning," Int'l. Conf. on AI and Statistics (AISTATS), vol. 15, pp. 215-223 (2011).
Cortes et al., "Support-Vector Networks," Machine Learning, vol. 20, Issue 3, pp. 273-297 (1995).
Esedoglu et al., "Upper Bounds on the Coarsening Rate of Discrete, Ill-Posed Nonliner Diffusion Equations," Communications on Pure and Applied Mathematics, vol. 62, No. 1, pp. 57-81 (2009).
Guo et al., "Temporal Video Denoising Based on Multihypothesis Motion Compensation," IEEE Transaction on Circuits and Systems for Video Technology, vol. 17, No. 10, pp. 1423-1429 (Oct. 2007).
Heess et al., "Weakly Supervised Learning of Foreground-Background Segmentation using Masked RBMs," University of Edingburgh, IANC, Edinburghm, UK, pp. 1-8 (2011).
MSU Graphics & Media Lab (Video Group), "Lossless Video Codecs Comparison '2007," pp. 1-131 (Mar. 2007).
Nowak et al., "Wavelet-Domain Filtering for Photon Imaging Systems," IEEE Transactions on Image Processing, vol. 8, No. 5, pp. 666-678 (May 1999).
Oh et al., "JPEG2000 and JPEG: Image Quality Measures of Compressed Medical Images," NCTT Proc. 4th National Conf. Telecommun. Tech., Shah Alam, Malaysia, pp. 31-35 (2003).
Otsu, "A Threshold Selection Method from Gray-Level Histograms," IEEE Trans. Sys., Man., Cyber., vol. 9, No. 1, pp. 62-66 (Jan. 1979).
Rahman et al., "Video Denoising Based on Inter-frame Statistical Modeling of Wavelet Coefficients," IEEE Trans. Cir. and Sys. for Video Technol., vol. 17, No. 2, pp. 187-198 (2007).
Salomon, "Data Compression: The Complete Reference," Fourth Edition, Springer, pp. 1-1092 (2007).
Sheppard et al., "Signal-to-Noise Ratio in Confocal Microscopes," Pawley JB, editor, Handbook of Biological Confocal Microscopy, Springer, pp. 442-452 (2006).
Stigler, "Francis Galton's Account of the Invention of Correlation," Statistical Science, vol. 4, No. 2, pp. 73-79 (1989).
Varghese et al., "Video Denoising Based on a Spatiotemporal Gaussian Scale Mixture Model," IEEE Transaction on Circuits and Systems for Video Technology, vol. 20, No. 7, pp. 1032-1040 (Jul. 2010).
Wiegand, "Draft ITU-T Recommendation and Final Draft International Standard of Joint Video Specification (ITU-T Rec. H.264, ISO/IEC 14496-10 AVC)," Joint Video Team (JVT) of ISO/IEC MPEG and ITU-T VCEG, JVT-G050, pp. 1-250 (2002).
Wollman et al., "High throughput microscopy: from raw images to discoveries," Journal of Cell Science, vol. 120, pp. 3715-3772 (2007).
Yang et al., "A Weighted Support Vector Machine for Data Classification," International Journal of Pattern Recognition and Artificial Intelligence, vol. 21, No. 5, pp. 961-976 (2007).
Notification of Transmittal of the International Search Report and the Written Opinion of the International Searching Authority, or the Declaration for International Application No. PCT/US2015/047433 (dated Dec. 10, 2015).

* cited by examiner

BEADS 1 μm

BEADS 500 nm

BRIGHTFIELD 1

BRIGHTFIELD 2

CELLS

FASTBEADS

METHODS, SYSTEMS, AND COMPUTER READABLE MEDIA FOR COMPRESSING VIDEO IMAGES

CROSS-REFERENCE TO RELATED APPLICATION

This application relates to and claims priority to U.S. Provisional Patent Application Ser. No. 62/044,152 filed Aug. 29, 2014, the disclosure of which is incorporated by reference herein in the entirety.

GOVERNMENT INTEREST

This invention was made with government support under Grant Nos. EB002025, CA155618 awarded by the National Institutes of Health and DMR-0817489 from the National Science Foundation. The government has certain rights in the invention.

TECHNICAL FIELD

The subject matter described herein relates to data compression. More specifically, the subject matter relates to methods, systems, and computer readable media for compressing video images.

BACKGROUND

The increasing use of high-speed, high-resolution and high-content microscopy systems is increasing the rate and amount of video data being acquired more rapidly than the rate of increase in affordable data storage [1]. This forces the bench scientist either to be very selective in which data sets he or she stores or to greatly compress his or her data [2]. At the same time, funding agencies and journals are increasingly requiring all data from published experiments be retained to enable re-analysis by others.

Accordingly, there exists a need for improved methods, systems, computer readable media for compressing video images while preserving the information needed to reproduce analysis results.

SUMMARY

Methods, systems, and computer readable media for compressing video images are disclosed. According to one exemplary method, the method includes classifying image pixels in each video image of a series of video images as either foreground or background. The method also includes replacing each pixel classified as background with a time-averaged value of pixel intensity for that pixel, and compressing the video images using a compression algorithm.

According to one exemplary method, the system includes at least one processor and memory, and a compressor implemented using the at least one processor and memory. The compressor may be configured to classify image pixels in each video image of a series of video images as either foreground or background, to replace each pixel classified as background with a time-averaged value of pixel intensity for that pixel, and to compress the video images using a compression algorithm.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
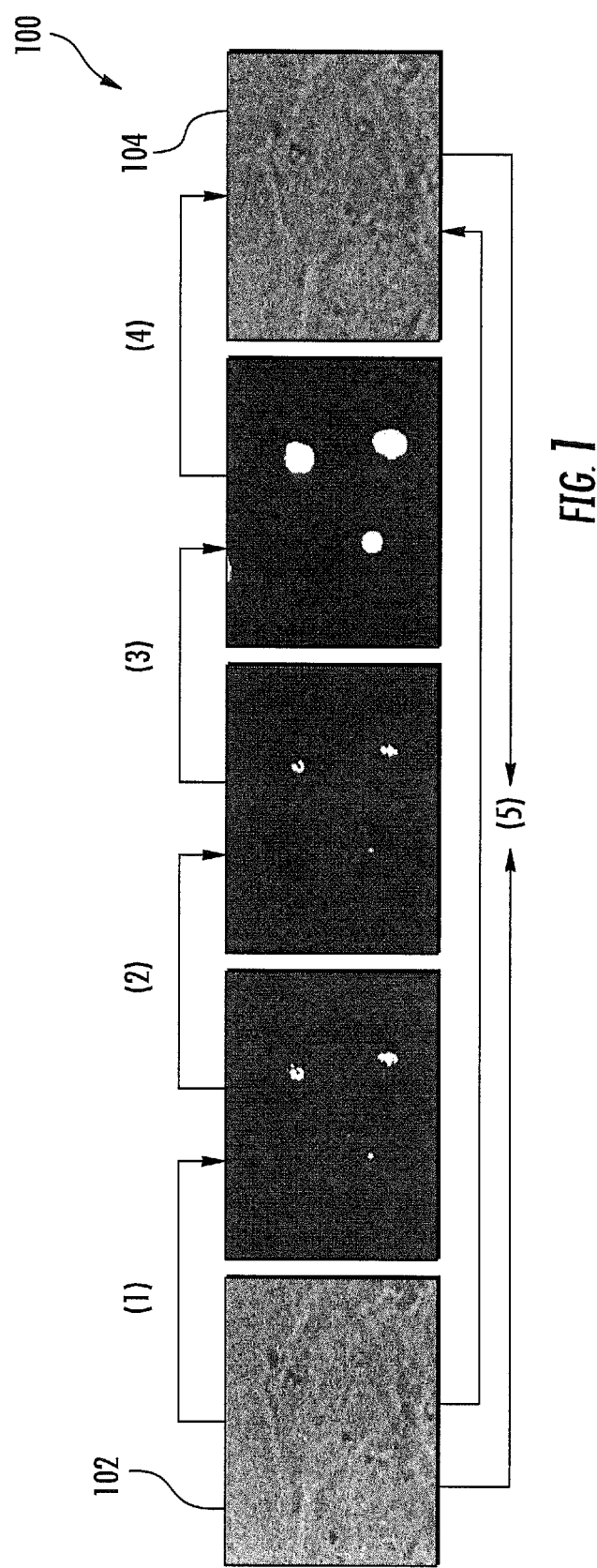
FIG. 1 is a diagram illustrating screenshots from an exemplary process for compressing video images according to an embodiment of the subject matter described herein.

The subject matter described herein discloses methods, systems, and computer readable media for compressing video images. However, the methods, systems, and computer readable media described hereinbelow are not limited to high-speed, high-resolution, and high-content microscopy systems, and may be used in a variety of other fields requiring significant video image compression.

There are a number of lossless compression techniques available that reduce the size of a data set while enabling exact reconstruction of the original file [3] [4] [5] [6]. Some have been developed specifically for use on images [3] and video data [4] [5]. Noise in the video images combined with the requirement that every pixel be exactly reproduced in every frame limits compression rates for these techniques.

Several high-quality image compression techniques are tuned specifically for the human visual system to produce image artifacts that are not easily seen (they are "perceptually lossless"). They achieve far greater compression rates without visible quality loss [3]. Similarly, a number of video-compression techniques exist, also finely tuned to avoid introducing visible artifacts [4].

The use of three new compression techniques for single confocal fluorescence micropcy images of cells was explored by Bernas et al. [7] to determine how much compression could be achieved based on the signal to noise ratio (SNR) of the images. Two techniques were used to estimate SNR for the images [8] [9]. Their spatial downsampling approach reduced image resolution to match the frequency at which the spatial intensity contrast passed below the estimated noise floor in the images. Their intensity downsampling approach reduced the number of intensities per pixel to the number of distinguishable levels based on the noise floor. Their wavelet compression approach removed wavelet coefficients that were expected to represent only noise. They achieved compression ratios of between 3 and 9 without significant reduction in three quality tests. Yet, a need exists for achieving compression ratios of up to 100 for 96-well experiments.

In order to decrease the transmission bandwidth for time-series of confocal optical microscopy image transmission, the impact of different quality levels of JPEG compression (compared to lossless compression) on the image intensity variance in single 2D images [10] was examined. This impact was compared to estimates of image noise based on the variance in visually uniform background regions, which led to a hypothesis that adding only slight compression noise compared to the already-present background noise may not impede quantitative analysis (i.e., 20% increase in noise). Subsequently, time-averaged versions of the same region were compared to simulate images with different noise levels. It was found that at a JPEG quality setting of 75/100, the noise variance was much higher than the difference variance (22-32× greater); at this value, the compression ratio varied between around 3 (noisy image) and 5 (less-noisy image). The compression ratio was never more than 11, even for images with significant degradation.

In some embodiments, an exemplary technique in accordance with some aspects of the present subject matter may achieve up to 100× video compression, enabling high-throughput video-acquisition experiments to be stored in the same space as conventional experiments for microscopy video compression. In some embodiments, the compression may have no impact on analysis—it is "scientifically lossless". This may be achieved by storing only the information in a video that analysis may use and averaging out noise in the background, by first separating every frame into foreground (pixels that carry information) and background (pixels that do not change throughout the video) and then losslessly compressing the foreground regions. This may successfully keep all relevant data while simultaneously achieving a better compression ratio. In testing, such a method achieved a best compressed size of 0.77% of the original size (over 100× compression), whereas the best standard technique yields 20% (~5× compression) for the same video.

Accordingly, FIG. 1 illustrates an exemplary video method compression technique to achieve improved compression results in comparison with existing lossless techniques. Perceptually-tuned lossy algorithms greatly impacted analysis when forced to achieve the same compressed size. In order to achieve such significant compression, a first step (1) may include classifying each pixel in each video image as either foreground or background. For example, in an original microscopy video, the noise behavior may be well understood to be independent between neighboring pixels, whereas blurring (convolution with the point-spread function (PSF)) will spread image brightness changes in one pixel to its neighbors [11]. Making use of this property, three techniques for separating foreground from background are presented hereinbelow. However, one of the ordinary skill in the art can understand that the three techniques discussed are not the only techniques that may be used. Other appropriate techniques not mentioned herein may also be used.

Additionally, multiple methods for separating foreground from background may be compared in order to determine which method has the best results. The one with the best results may be ultimately applied in the proposed video image compression technique. In some embodiments, confidence intervals may be applied to the methods being compared. For example, when using confidence intervals the weight of each method may be estimated by an inverse of a variance. A low variance may correspond to a high weight, while a high variance may correspond to a low weight. Accordingly, a method with a high weight may be indicative of a higher level of confidence in the results, whereas a method with a lower weight may be indicative of a lower level of confidence in the results. Thus, the method with the highest level of confidence may be the most appropriate method to use in the proposed video image compression technique.

Furthermore, the results of the multiple methods for separating foreground from background may be combined by averaging their outputs. This may be done by a weighted average, where the weight of the contribution from each algorithm is determined by multiplying its value by the inverse of its variance. The resulting sum may then be normalized by the sun of the inverse variances of all methods.

Initially, the background noise in the video may be well modeled by a Gaussian distribution plus a Poisson distribution:

$$N(0,\sigma)+P(\lambda)$$

Importantly, neither of these terms depends on the values of neighboring pixels: they are identically randomly distributed among the pixels in the image [11]. For example, in microscopy video the mixture of values from neighboring pixels caused by the PSF may be an important consideration. This may cause changes in each pixel's intensity over time to be correlated with those of neighboring pixels. As a result, in a microscopy video, correlation between a pixel and its neighbors tends to become nonzero whenever it may be caused by changes in intensity due to specimen motion or specimen brightness change.

In some embodiments, a novel first correlation-based method may be implemented, as illustrated in FIG. 1, in order to separate foreground pixels from background pixels. Generally, the method based on correlation may be understood as thresholding on a score for every pixel location to make the foreground/background decision. Pixels with a score higher than the threshold may be classified as foreground, while the pixels with a score lower than the threshold may be classified as background.

The method first generates a binary segmentation of each frame into foreground and background pixels by thresholding on the maximum magnitude of the Pearson's correlation coefficient [12] between each pixel and its eight neighbors. This coefficient may be computed over all frames of the video, selecting pixels whose brightness changes are correlated with those of their neighbors. As detailed below, a foreground/background mask for pixels in the video may be generated in order to generate another version of the video. In this new video, the foreground pixels are the same as in the original, but each background pixel may be replaced in all frames by its mean value over time. The resulting video has every background pixel's intensity constant over time, which may enable the resulting video to be better compressed by a standard compression algorithm (e.g. lossless H.264 compression).

For each pixel in a video, the intensity value over time as a vector may be considered. For example, in a video with dimensions m×n, there may be m×n vectors. The score for each pixel may be computed based on the absolute value of the Pearson's correlation between that pixel's intensity value vector and each of its neighbors' vectors. We denote this value as $R_i$ and compute it as:

$$R_i = \left| \frac{E[(x_j - \bar{x})(y_{ij} - \bar{y}_i)]}{\sigma_x \sigma_{y_i}} \right|$$

where $x_j$ is the pixel intensity value for the center pixel at jth frame, $\bar{x}$ is the mean pixel intensity value for the center pixel. $y_{ij}$ is the pixel intensity value for the neighbor pixel at jth frame; $\bar{y}_i$ is the mean pixel intensity value for the neighbor pixel.

This value may be computed for all eight neighboring pixels. To be conservative in the estimate of foreground pixels, the maximum of all neighboring pixels may be computed and this score may be used to determine which pixels are in the foreground.

After every pixel has a score assigned to it, a threshold may be selected such that all pixels whose score may be above the threshold may be considered foreground pixels, and pixels whose score may be below the threshold may be classified as background. Notably, there is an impact on compression size as the threshold is increased; where fewer pixels are selected as foreground the compression ratio may improve. However, at some point this may cause foreground pixels in the image to be missed, which may impact the data analysis and the compression may cease to be scientifically lossless. After several iterations using various thresholds, the threshold that results in the best compression without impact on analysis should be selected.

However, the correlation-based method may be limited. For example, it may not yield a high enough response for certain foreground pixels in certain types of video (e.g. microscopy video) or it may not be fast enough for some applications. One technique to improve the correlation-based method may be to use standard Support Vector Networks (SVNs), for example, one or more Support Vector Machines (SVMs) [16].

A SVM needs to be trained before performing classifications. The training process requires training examples in two classes. To generate such a training example, the correlation-based method may be used. Besides the correlation-based method, other types of foreground indicators may be used, such as, for example, shape property of a quantile curve. A quantile curve may be used to describe the pixel intensity over time property. Combining the quantile curve information with the correlation information, the feature vector may be composed. Along with the labels from the correlation scores, the training example may be generated. Once the SVM is trained, a more robust foreground-background classifier may be built, since classification computation is very fast by the algorithm's nature.

In addition, algorithms other than the standard SVM may be used. For example, a variation of the standard SVM, such as the "weighted SVM" [16][17] may be used and may yield an even better performance.

In another embodiment, a normality test method may be implemented in order to separate foreground pixels from background pixels. For example, the Kolmogorov-Smirnov (K-S) test may be used. Generally, the K-S test approach performs a statistical normality test on an intensity value of each pixel over time and decides how likely the intensity values follow a Gaussian distribution. A pixel that passes the normality test should be classified as a background pixel, while a pixel that does not pass the normality test should be classified as a foreground pixel.

Figure 2B:
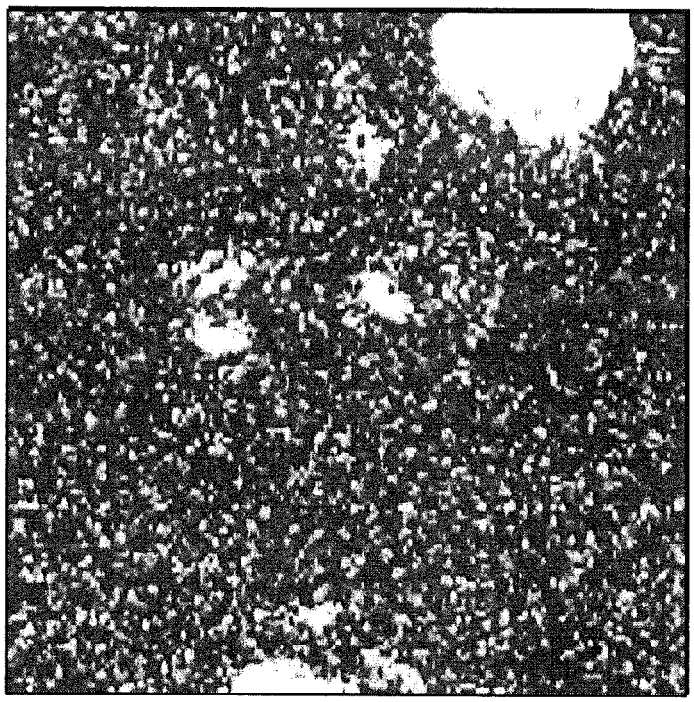
FIG. 2B is a screenshot illustrating a map for foreground/background segmentation using the correlation-based method according to an embodiment of the subject matter described herein.
Figure 2A:
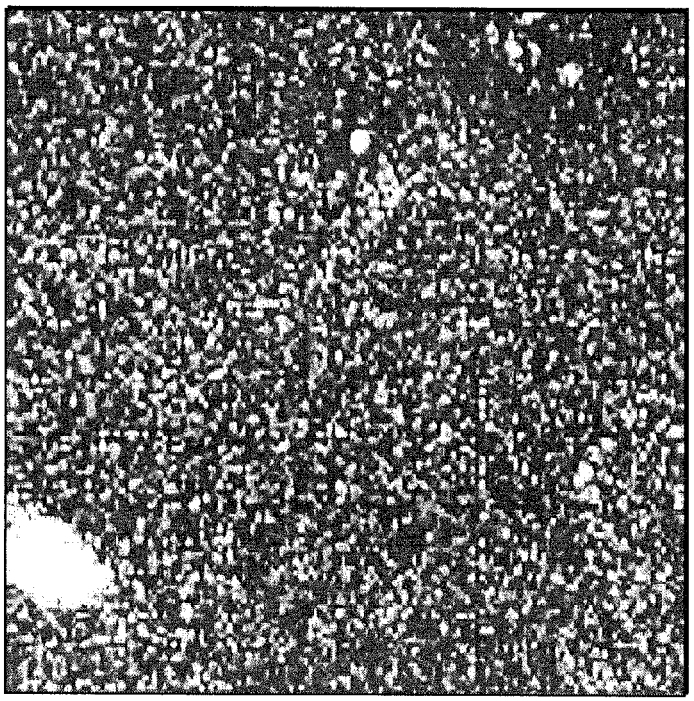
FIG. 2A is a screenshot illustrating a map for foreground/background segmentation using the Kolmogorov-Smirnov (K-S) Test according to an embodiment of the subject matter described herein.

FIGS. 2A-2B illustrate a comparison of an exemplary binary map for foreground and background labeling using the K-S test (FIG. 2A), and the correlation-based method (FIG. 2B). In FIG. 2A, a screenshot of a video image 200A illustrates how the K-S test failed to label most foreground pixels in the lower right corner and mislabeled a region in the upper left area as foreground. By comparison, FIG. 2B illustrates a screenshot of a video image 200B where the threshold was set as 0.27 and the score ranged from 0 to 1. In comparison with the K-S test in FIG. 2A, the correlation-based method succeeded in labeling most foreground pixels in the lower right corner and properly labeled a region in the upper left area as foreground.

In another aspect, a Principal Component Analysis (PCA) method may be implemented in order to separate foreground pixels from background pixels. The following will be a description of the PCA method, which may actually comprise a combination of a variety of different probability and statistical functions, in addition to the use of PCA.

In some embodiments, for example, quantile functions may be applied, such that the first pixel value will be the first quantile, etc. For each pixel, the intensity value over time may be sorted into increasing intensities from the dimmest intensity to the brightest intensity. SVM or other tests on the quantile functions may be performed in order to determine if each pixel may be background or foreground.

In some embodiments, for example, the parameters of a Taylor-series expansion or the set of parameters for another functional fit to the quantile curves may form part of the feature vector. SVM or other tests on the parameters may be performed in order to determine if each pixel may be background or foreground.

In some embodiments, RCA may be implemented in order to separate foreground pixels from background pixels. For example, PCA may be used to determine which combinations of elements in the feature vector are best suited for determining foreground and background.

Regardless of the method that may be used to separate the foreground pixels from the background pixels, there may be pixels falsely labeled as foreground because even independent random variables have nonzero correlations with some probability. These pixels are likely to be spread evenly across the image, whereas true foreground pixels may be grouped into clusters that are at least as large as the main lobe of the PSF. To remove these false positives, binary segmentation may be refined by a mathematical morphology erosion operation [14], as illustrated in step (2).

The mathematical morphology erosion operation may effectively place a disk on each of the foreground pixels. Thus, for example, if all of the pixels in the disk are also foreground, the pixel may be left as foreground. Otherwise the pixel may be background. The diameter of the disk used in the operation may vary. In some embodiments, the diameter of the disk may depend on the PSF of the microscope used. For example, a disk diameter of 3 pixels may be used.

Figure 3A:
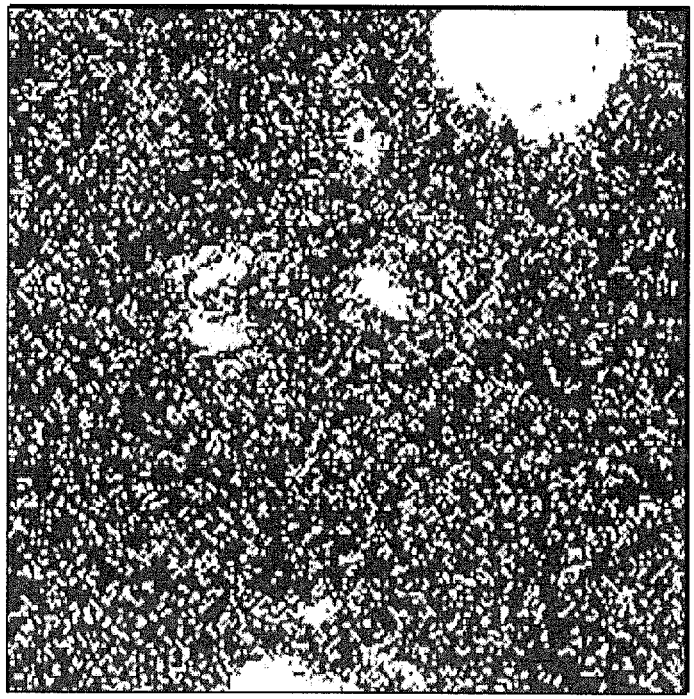
FIG. 3A is a screenshot illustrating mathematical morphology results on an exemplary video image from a series of video images before refinement by erosion and dilation.
Figure 3B:
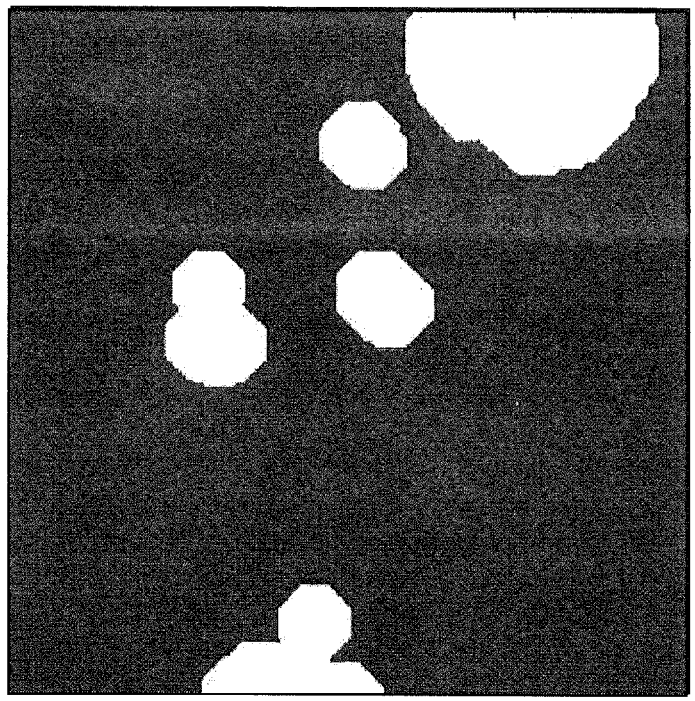
FIG. 3B is a screenshot illustrating mathematical morphology results on the exemplary video image of FIG. 3A after refinement by erosion and dilation according to an embodiment of the subject matter described herein.

In reference to step (3), a mathematical morphology dilation operation may be used on the resulting set of foreground pixels to include pixels that are close enough to affect analysis. The radius used in the operation may depend on the parameters of the analysis algorithm. In one aspect, data may be evaluated using CISMM Video Spot Tracker [15], which uses trackers with a fixed radius. The dilation operator may determine the size of neighborhood. To fit the spot tracker's radius, a radius of, e.g., 51 pixels may be used. For example, FIGS. 3A-3B illustrate exemplary binary maps before refinement (i.e., FIG. 3A) and after refinement (i.e., FIG. 3B) using CISMM Video Spot Tracker with a radius of 51 pixels. In FIG. 3A, a screenshot of a video image 300A illustrates mathematical morphology results before refinement by erosion and dilation, while in FIG. 3B, a screenshot of a video image 300B illustrates mathematical morphology results after refinement by erosion and dilation.

In step (4), once the binary segmentation has been refined, the original video may have each pixel in its background regions replaced by that pixel's time-averaged value to remove noise. This may enable the video to able to be better compressed using a compression algorithm, such as, for example, lossless or lossy H.264 compression.

Finally, in step (5), in order to verify that the compression has been successful, the compressed video may be processed by the same analysis as the original video. For example, to verify that the compression may be scientifically lossless, the compressed video may be processed by the same analysis pipeline to make sure the results exactly match those of the original video. As apparent in FIG. 1, original video 102 and compressed video 104 are indistinguishable.

Alternatively, in some embodiments, where lossy compression is utilized in step (4), step (5) my not require the compressed video results to exactly match those of the original video, but to allow some difference between the two analysis results (i.e., on the compressed video and on the original video). In such a way, it may be possible to compress the original video even smaller than lossless compression techniques. For example, application of a set of statistical tests during analysis may determine whether the compressed video is of good quality by taking the impact of existing random noise in the original, uncompressed video into account. Accordingly, the method illustrated in FIG. 1 may be utilized to achieve compression ratios of up to 100 for video images.

Figure 4A:
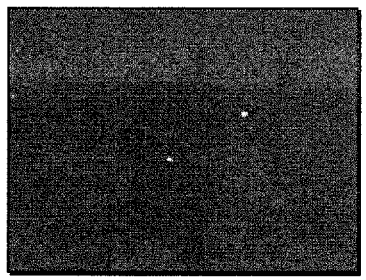
FIGS. 4A-4F are screenshots each illustrating exemplary video images of videos that have been compressed according to an embodiment of the subject matter described herein.
Figure 4B:
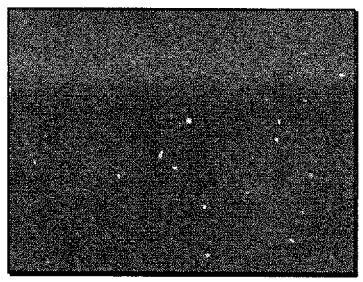

Referring now to FIGS. 4A-4F, a discussion of experimental results of six cases, each of which is represented in one of FIGS. 4A-F, is provided. FIG. 4A illustrates a screenshot 400A of a fluorescence imaging video having 1000 frames of moving beads attached to cell membranes. The beads in FIG. 4A have diameters of 1 μm. In FIG. 4B, a screenshot 400B of a fluorescence imaging video having 1000 frames of moving beads attached to cell membranes is illustrated. The beads in FIG. 4B have diameters of 500 nm, where screenshot 400B in FIG. 4B clearly has more beads than screenshot 400A in FIG. 4A.

Figure 4C:
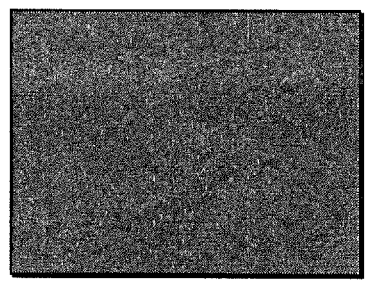
Figure 4D:
Figure 4E:
Figure 4F:
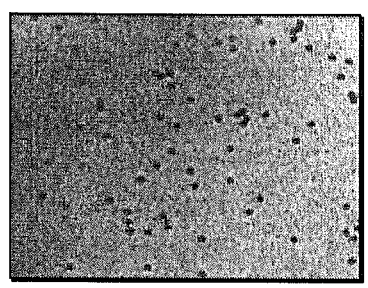

FIG. 4C illustrates a screenshot 400C of a brightfield imaging video 1 having 1000 frames of moving beads attached to cell membranes, while FIG. 4D illustrates a screenshot 400D of a brightfield imaging video 2 having 1000 frames of moving beads attached to cell membranes. FIG. 4E illustrates a screenshot 400E of an imaging video consisting of cells moving in brightfield imaging. FIG. 4F illustrates a screenshot 400F of an imaging video consisting of beads that stay mostly still for the first half of the video and then move rapidly in one direction.

Table 1 compares the performance of the above described method with regard to FIG. 1 against lossless H.264 compression. The size achievable using scientifically-lossless compression scales with the information content of the video, where videos with information in every pixel see no improvement. For the 500 nm video (i.e., FIG. 4B, which has more foreground than the 1 μm video) a compressed size of 19.6% (rounded to 20%) is achievable; only slightly better than lossless H.264, alone. For the video with little foreground, the compressed size reaches 0.77%, 25 times better than lossless H.264 alone and an overall reduction factor of 100×.

TABLE 1

| H.264 Lossless | Beads 1 μm | Beads 500 nm | Brightfield 1 | Brightfield 2 | Cells |
|---|---|---|---|---|---|
| Without presently disclosed subject matter | 20% | 28% | 47% | 50% | 33% |
| Including presently disclosed subject matter | 0.77% | 20% | 44% | 7.3% | 4.8% |

FIGS. 5A-5D illustrate plots of the compression ratio (in percentage) vs. correlation magnitude threshold on scores of beads 1 μm, beads 500 nm, brightfield 1, and brightfield 2, corresponding to the compression ratios illustrated above in Table 1. Each of the plots illustrated in FIGS. 5A-5D include a horizontal, solid line indicating the compression ratio on the respective video using H.264 lossless. A plurality of data points fitted with a curve indicates the compression ratio on the respective video using the presently disclosed method. Notably, in each of the plots, the curves become dashed when the analysis results on compressed videos (e.g., 104, FIG. 1) differs from the analysis result on the original video (e.g., 102, FIG. 1), indicating the compression limit that may not impact analysis results.

Figure 5A:
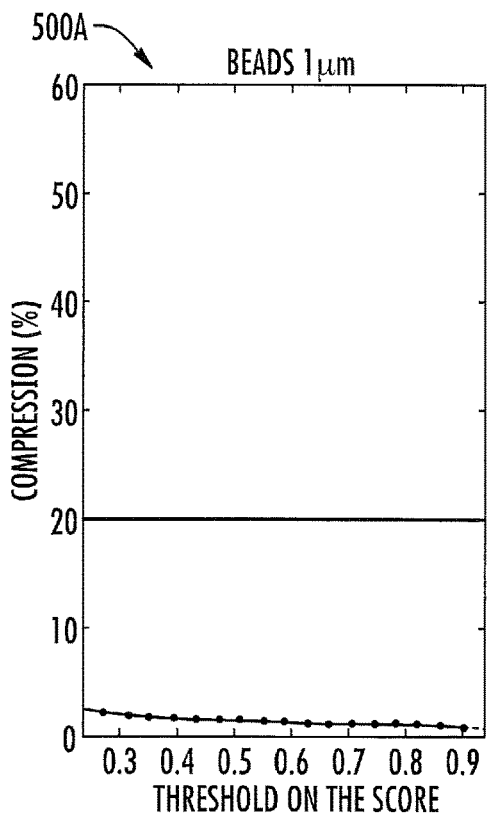
FIGS. 5A-5D are graphical representations each illustrating an impact on compression size as a threshold is increased in an exemplary plot of compression ratio versus correlation magnitude threshold according to an embodiment of the subject matter described herein.
Figure 5B:
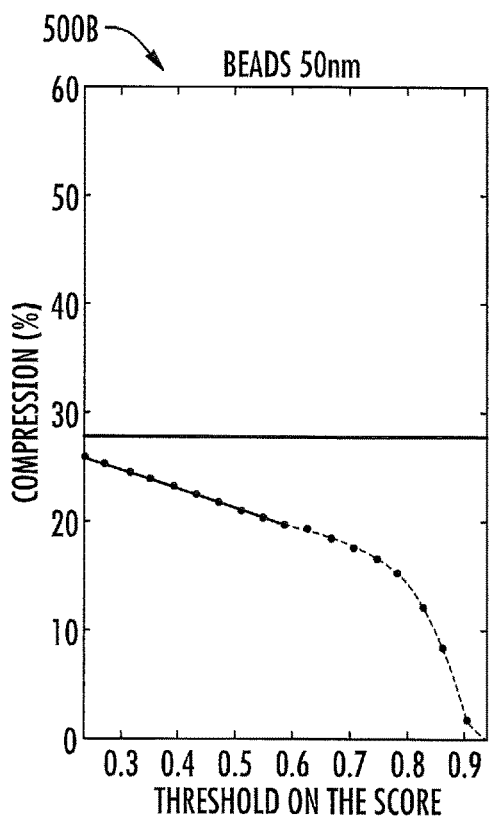
Figure 5C:
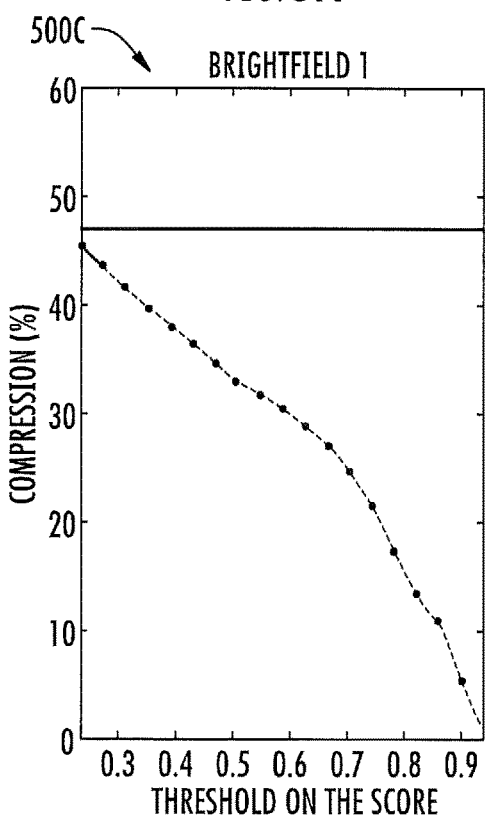
Figure 5D:
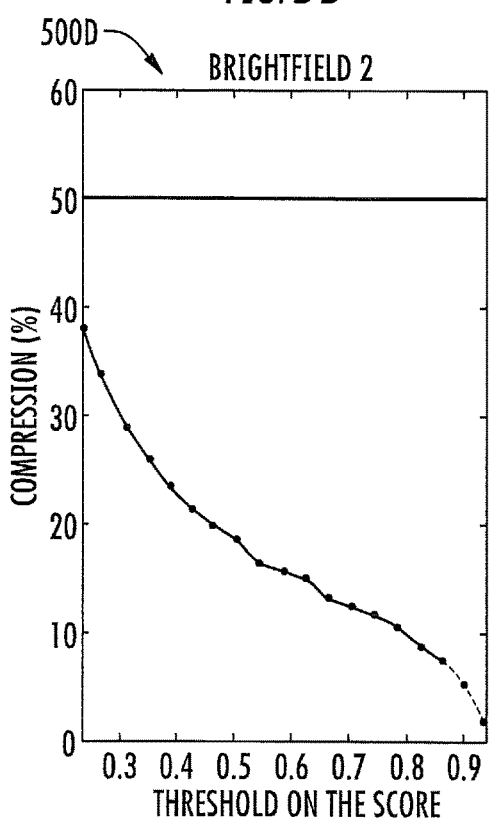

For example, FIG. 5A illustrates a compression plot 500A for a fluorescence imaging video having 1000 frames of 1 μm moving beads attached to cell membranes. FIG. 5B illustrates a compression plot 500B for a fluorescence imaging video having 1000 frames of 500 nm moving beads attached to cell membranes. FIG. 5C illustrates a compression plot 500C for brightfield imaging video 1 having 1000 frames of moving beads attached to cell membranes, while FIG. 5D illustrates a compression plot 500D of a brightfield imaging video 2 having 1000 frames of moving beads attached to cell membranes. As discussed in more detail below, Table 3 shows the compressed sizes for different thresholds for all cases.

In each of FIGS. 5A-5D, for example, the erosion diameter was set at 3 pixels and the dilation diameter was set to 51 pixels, which may be the size of the search radius for the tracking algorithm when it is testing for beads that disappear during tracking. In other examples, without disappearing beads, the dilation diameter may be set to be 24 pixels to achieve higher compression. Dilation radius may depend on how many pixels the analysis algorithm looks at beyond the pixels that are part of the objects being analyzed.

Table 2 compares compressed videos to videos compressed using the perceptually-tuned H.264 with its quality parameter set to make the file size match the present disclosed method. Notably, JPEG2000 was also tested and had results similar to H.264. In some embodiments, the error metric may be defined as the maximum distance between points along bead traces, reported in units of the experiment noise floor. The presently disclosed subject matter may achieve zero (0) error, while the perceptually-tuned videos (e.g., compressed using H.264 lossy) had errors ranging from 2-50 times the noise floor and sometimes lost beads entirely.

TABLE 2

| Error | Beads 1 μm | Beads 500 nm | Brightfield 1 | Brightfield 2 |
|---|---|---|---|---|
| Lossy H.264 | 4.6 | ∞ | 50.3 | 2.6 |
| Presently Disclosed Subject Matter | 0 | 0 | 0 | 0 |

Table 3 shows the results of doing compression tests with algorithms other than H.264 lossless or lossy. The first and sixth columns of this table match Table 1. Column 5 shows the result of using Bzip2 compression on the original files, which may be usually slightly worse and in one case slightly better than lossless H.264. Column four shows the result of using lossless JPEG2000 on the original videos, which is never better than lossless H.264. Columns two and three show the results of using Bzip2 and lossless JPEG2000 on the images after the presently disclosed subject matter has been applied, which were always worse than using H.264 after the presently disclosed subject matter.

TABLE 3

| | Techniques applied with presently disclosed approach | | | Techniques applied without presently disclosed approach | | |
|---|---|---|---|---|---|---|
| Video | H.264 | Bzip2 | JPEG2000 | JPEG2000 | Bzip2 | H.264 |
| Bead 1 μm | 0.77% | 0.79% | 1.3% | 24% | 19% | 20% |
| Bead 500 nm | 20% | 21% | 23% | 31% | 29% | 28% |
| Brightfield 1 | 44% | 49% | 46% | 47% | 51% | 47% |
| Brightfield 2 | 7.3% | 26% | 29% | 50% | 54% | 50% |

Figure 6B:
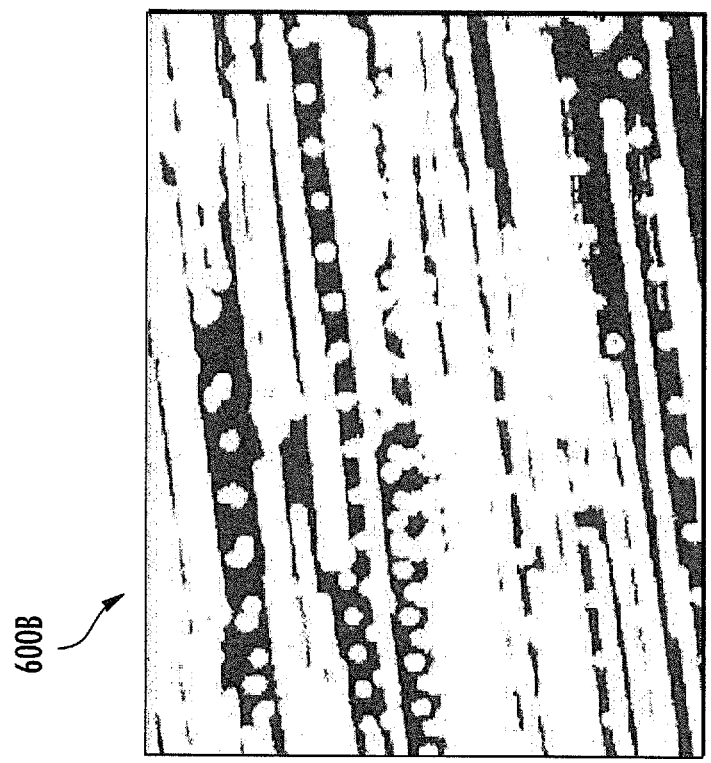
FIG. 6B is a screenshot illustrating foreground/background segmentation on an exemplary video image from a series of video images according to an embodiment of the subject matter described herein.
Figure 6A:
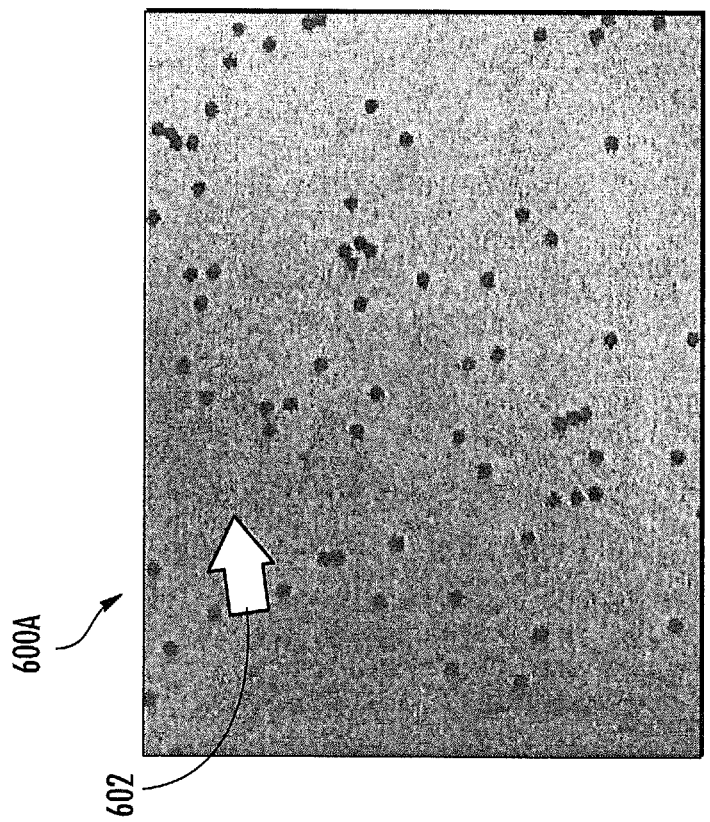
FIG. 6A is a screenshot illustrating fast moving beads on an exemplary video image from a series of video images prior to the beads moving according to an embodiment of the subject matter described herein.

In some embodiments, foreground objects in microscopy videos move quickly over time and may cover most of the frame throughout the course of the entire video. In cases such as this, classifying pixels as background and foreground using the above-discussed methods may not work as well, as more pixels may be wrongly identified as foreground. For example, FIG. 6A illustrates a screenshot of a video image 600A from a frame of a video containing 250 frames, where fast moving beads move in a direction indicated by arrow 602. FIG. 6B illustrates a screenshot of a video image 600B where foreground/background segmentation of pixels is illustrated, such that most of the pixels are classified as foreground.

Figure 7:
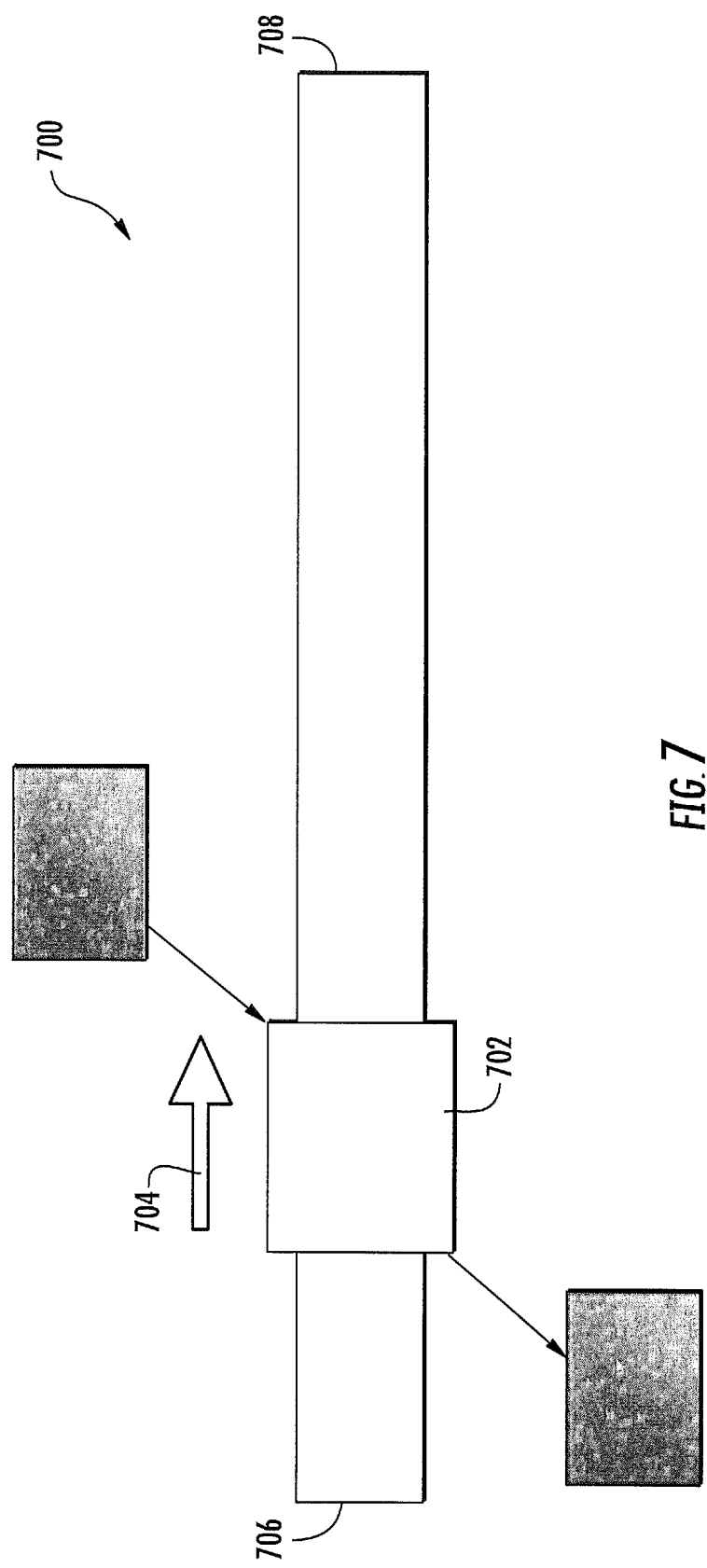
FIG. 7 is a diagram illustrating an application of a sliding-window extension to a set of video images according to an embodiment of the subject matter described herein.

As a result, using a sliding-window extension in addition to the already disclosed methods may improve distinguishing pixels between background and foreground. FIG. 7 illustrates an exemplary sliding window extension 700. In FIG. 7, a fixed length (in time) virtual window 702 may be slid in a direction indicated by arrow 704 from the beginning of the video 706 to the end of the video 708 in order to update the foreground and background pixels using only frames within the window 702. For a video of length l (in time) and window size s, there are (l-s) different binary maps. By segmenting out only pixels with beads moving over them in a short time period, the sliding-window version of the method marks fewer pixels as foreground in each frame.

Table 4 illustrates the additional compression provided by the sliding-window technique for a video with fast-moving beads and using lossless H.264 compression, alone. With longer windows, the beads moved across essentially every pixel in the image, so the method produced almost no improvement over lossless H.264 compression, alone. With very short windows, noise suppression was slightly reduced. Based on these findings, it may be determined that in some embodiments an optimal window size for this video was 20 frames, resulting in an approximately 2× improvement in file size. In order to achieve smaller compression, smaller dilation diameters (i.e., less foreground) may be utilized.

TABLE 4

| | Dilation Diameter 8 Pixels | | Dilation Diameter 20 Pixels | | |
|---|---|---|---|---|---|
| Window size | With sliding window | No sliding window | With sliding window | No sliding window | Lossless H.264 |
| 100 frames | 16% | 35% | 21% | 39% | 39% |
| 50 frames | 15% | | 21% | | |
| 20 frames | 14% | | 19% | | |
| 10 frames | 15% | | 20% | | |
| 5 frames | 20% | | 24% | | |

In some embodiments, a microscopy video of moving cells (i.e., non-bead-based specimens) may be compressed. The method discussed hereinabove achieved 6.8× better compressions than lossless H.264 compression alone when compressing a video of non-bead based specimens. Notably, even non-high-throughput cell-motion videos often use low frame rates to reduce the amount of video storage required, which causes large motion in between frames and which may be challenging for vision-based tracking algorithms to handle. An increased frame rate may enable storing a much finer time resolution in the same file size; potentially improving the resulting analysis.

Accordingly, the presently disclosed subject matter includes exemplary video image compression techniques, which are capable of significantly compressing video data by separating foreground and background pixels and subsequently averaging pixel intensities in the background, as well as other aspects associated with compressing video images. Unlike previous techniques, which may use spatial downsampling to reduce image resolution to match the frequency at which the spatial intensity contrast passed below the estimated noise floor in the images, one exemplary technique described herein utilizes thresholding on a score for every pixel location to make the foreground/background decision. For example, an exemplary technique in accordance with some aspects of the present subject matter may provide significant compression of video images capable of achieving compression ratios of >100, reducing file size by 99+%.

Figure 8:
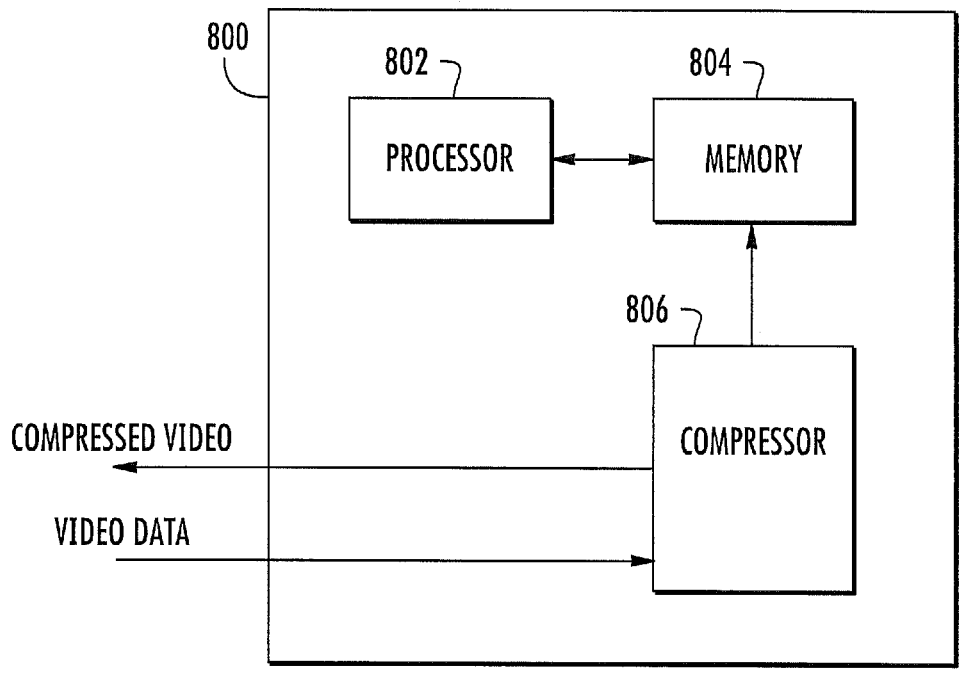
FIG. 8 is a diagram illustrating an exemplary environment for compressing video images according to an embodiment of the subject matter described herein.

FIG. 8 is a diagram illustrating an exemplary system 800 for compressing video images according to an embodiment of the subject matter described herein. Referring to FIG. 8, a system 800 may represent a computing platform or group of computing platforms, such as servers, connected through a communication network such as the Internet, an intranet, a local area network (LAN), and/or a wide area network (WAN). In some embodiments, system 800 may include one or more computing platforms that use virtualization or related resources, such as a virtual machine or virtual node. System 800 and/or entities therein may be utilized to perform various tasks, functions, or services. For example, system 800 and/or entities therein may be utilized for compressing video data for high-speed, high-resolution and high-content microscopy systems.

System 800 may include node(s) for performing one or more aspects associated with compressing video data. Node(s) may be any suitable entity or entities, such as a computing device, a processor, memory, a virtual machine, or multiple computing platforms, for performing one more aspects associated with image compression, where components, modules, and/or portions of node(s) may be implemented or distributed across multiple devices, virtual machines, or computing platforms. In some embodiments, for example, node(s) may comprise at least one processor 802 and memory 804.

System 800 may include a compressor module 806. Compressor module 806 may be any suitable entity or entities (e.g., software executing on a processor, a field-programmable gateway array (FPGA), an application-specific integrated circuit (ASIC), or a combination of software, an ASIC, or an FPGA) for performing one or more aspects associated with compressing video data. Exemplary aspects associated with video compression performable by compressor 806 may include receiving video data, classifying one or more image pixels within video images of a series of video images as either foreground or background, performing one or more mathematical morphological operations, such as, for example, erosion and/or dilation, replacing each pixel classified as background with a time-averaged intensity value, and/or compressing the received video data using a compression algorithm. Other modules, not shown, may also be included in system 800 to perform other the exemplary aspects of video compression listed hereinabove, although compressor module 806 may be used to perform all of or only a portion of said aspects, as well.

In some embodiments, system 800 may include single or multiple processors, such as graphics processing unit (GPUs). For example, processor 802 may be representative of a single processor or multiple processors. Each processor may represent any suitable entity (e.g., a physical processor, an ASIC, or an FPGA) for performing one or more aspects associated with image compression. For example, compressor module 806, or software therein, may be executable by one or more processors 802.

In some embodiments, compressor module 806 may include functionality for receiving or sending information from or to various entities. For example, compressor module 806 may include one or more communications interfaces for receiving or sending information from or to processor 802, memory 804, and/or other entities associated with system 800.

In some embodiments, compressor module 806 may provide a communications interface for communicating with a user device (not shown). The user device may be any entity (e.g., system, apparatus, computing platform, etc.) that communicates with compressor module 806 and/or another entity in system 800. For example, the user device may be a microscopy system configured to transmit and receive video data to and/or from system 800. In such an example, compressor module 806 may be configured to receive video data from the microscopy system (not shown) and send compressed video back to the microscopy system. The user device may suitably store compressed video data to be accessed by (e.g. read from and/or write to) various entities, such as processor 802, memory 804, and/or other entities associated with system 800.

Exemplary user interfaces for communicating with compressor module 806 or other entities may support automation (e.g., via one or more scripting languages), a representation state transfer (REST) API, a command line, and/or a web based GUI.

In some embodiments, compressor module 806 may classify image pixels in each video image of a series of video images as foreground or as background pixels. For example, compressor module 806 may use one or a combination of various techniques to classify the pixels. As discussed hereinabove, three of these techniques may include a correlation-based method, a normality test method, and a principal component analysis method. However, one of ordinary skill in the art may recognize that other appropriate techniques may also be used. In some embodiments, a combination of tests may be used and confidence intervals may be applied to weight the results of each.

In some embodiments, compressor module 806 may be configured to use a sliding window technique to define ranges of time in which classifying pixels as background or foreground is performed. For example, where video image data comprises fast moving beads across a cell membrane, a fixed length window may be "slid" from a first frame of the video series to a last frame of the video series to update the foreground and background pixels using only the frames within the series. However, one of ordinary skill in the art may understand that the window need not be slid from the first frame to the last frame, and may be slid between other time intervals within the video series.

In some embodiments, compressor module 806 may perform mathematical morphology operations to the classified pixels, e.g., erosion and/or dilation.

In some embodiments, compressor module 806 may average the pixel intensity for each background pixel over time and replace each background pixel with the time-averaged pixel intensity value for that pixel.

In some embodiments, compressor module 806 may include functionality for compressing a received video using one or more compression techniques. Exemplary compression techniques may include video compression codecs, such as an H.264 codec, a Bzip2 codec, or a JPEG2000 codec. In some embodiments, compressor module 806 may be configured to receive video data for compressing the video. For example, compressor module 806 may receive video data that has already undergone binary segmentation and been subsequently refined. In other embodiments, compressor module 806 may perform binary segmentation and refine the video image data, itself. Compressor module 806 may then compress and store the received video, and one or more tags or pointers identifying the original video, where such video data may be substantially smaller (e.g., in bit or byte size) than the original (e.g., uncompressed) received video data. In further embodiments, other modules or nodes (not shown) may perform one or more of these actions performed by compressor module 806 according to the present subject matter.

It will be appreciated that FIG. 8 is for illustrative purposes and that various nodes, their locations, and/or their functions may be changed, altered, added, or removed. For example, compressor module 806 and/or functionality therein may be performed by the user device (not shown). In another example, some nodes and/or functions may be combined into a single entity or some functionality may be separated into separate nodes or modules.

Figure 9:
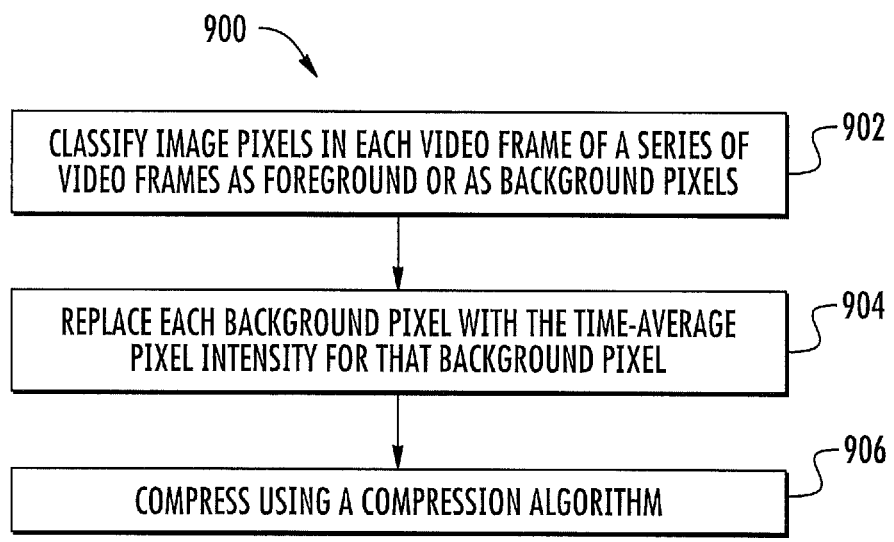
FIG. 9 is a diagram illustrating an exemplary process for compressing video images according to an embodiment of the subject matter described herein.

FIG. 9 is a diagram illustrating an exemplary process 900 for performing video image compression according to an embodiment of the subject matter described herein. In some embodiments, exemplary process 900, or portions thereof, may be performed by or at a computing platform and/or another node or module, other than the ones illustrated in FIG. 8. For example, processor 802, memory 804, and/or compressor module 806 may include a server or a virtual machine associated with system 800. In another example, compressor module 806 may include functionality at a user device (not shown).

Thus, when configured as described herein, system 800 becomes a special purpose computing platform that can improve the technological field of compressing video images. Specifically, system 800 is necessarily rooted in computer technology in order to overcome a problem specifically arising in the realm of computer networks (i.e., losslessly compressing, by a compressor, video images into substantially smaller (e.g., in bit or byte size) than the original (e.g., uncompressed) received video images).

Referring now to process 900, in step 902 video image pixels in each video image of a series of video images may be classified as either being a foreground or background pixel. For example, in a fluorescence imaging video taken from a high-speed, high-energy microscopy system (not shown), the video may have 1000 frames of moving beads attached to cell membranes. In this example, the moving beads may be classified as foreground and the cell membranes may be classified as background.

In some embodiments, classifying each pixel may comprise utilizing a correlation-based method to generate a binary segmentation of each video image into foreground and background pixels by thresholding on the maximum magnitude of the Pearson's correlation coefficient [12] between each pixel and its eight neighbors.

In some embodiments, classifying each pixel may comprise utilizing a normality test method to identify as foreground pixels those with a non-normal intensity distribution over time and to identify as background pixels those with a normal intensity distribution over time.

In some embodiments, classifying each pixel may comprise utilizing a principal component analysis (PCA) method to identify pixels as foreground or background. For example, the PCA method may comprise utilizing quantile curves to identify pixel features useful in distinguishing between foreground and background and for classifying the pixels as foreground or background using the identified feature. In addition, the PCA method may comprise utilizing parameterized functions fit to quantile curves to identify pixel features useful in distinguishing between foreground and background and for classifying the pixels as foreground or background using the identified feature. Further, the PCA method may comprise utilizing principal component analysis to identify pixel features useful in distinguishing between foreground and background and for classifying the pixels as foreground or background using the identified feature.

In some embodiments, classifying each pixel may comprise utilizing machine learning, possibly using support vector machines, to identify pixel features useful in distinguishing between foreground and background and for classifying the pixels as foreground or background using the identified feature.

In some embodiments, classifying each pixel may comprise identifying and removing false positives. For example, the mathematical morphology erosion operation may be performed.

In some embodiments, classifying each pixel may comprise extending a region of pixels classified as foreground to include pixels that may be close enough to affect analysis. For example, the mathematical morphology dilation operation may be performed.

In some embodiments, classifying each pixel may comprise using a sliding-window to define ranges of time in which the classification is performed. For example, a sliding-window extension may be added, such that a fixed length (in time) window may be slid from the beginning of the video series to the end of the video series to update the foreground and background pixels using only frames within the window. As a result, pixels with beads moving over them in a short time period may be segmented out.

In step 904, each identified background pixel may be replaced with the time-averaged pixel intensity that has been computed for that background pixel. For example, compressor module 806 may replace each background pixel with the time-averaged pixel intensity for that background pixel.

In some embodiments, replacing each background pixel may comprise a module and/or node associated with system 800 (i.e. compressor module 806) averaging pixel intensity for each background pixel.

At step 906, the original video comprising background pixels that have been replaced with the time-average intensity value may be compressed. For example, compressor module 806 may be configured to use a video compression technique, e.g., H.264 to compress a received video to be significantly smaller in size compared to the original, uncompressed version of the received video image.

In some embodiments, compressing a video image may include compressing the image using a video compression technique or algorithm, e.g., an H.262 codec, an H.263 codec, an H.264 codec, an H.265 codec, a JPEG 2000 codec, a Bzip2 codec, an MPEG-4 codec, an MPEG-2 codec, a VP6 codec, a VP7 codec, a VP8 codec, a VP9 codec, and/or another codec or technique.

INCORPORATION BY REFERENCE

The disclosure of each reference listed hereinbelow is incorporated herein by reference.

[1] Wollman, Roy and Stuurman, Nico, "High throughput microscopy: from raw images to discoveries," *Journal of Cell Science* (120). pp. 3715-3772.

[2] Oh T H, Besar R. 2003. JPEG2000 and JPEG: image quality measures of compressed medical images. NCTT Proc 4th National Conf Telecommun Tech, Shah Alam, Malaysia. pp 31-35.

[3] Christopoulos, C., Skodras, A. and Ebrahimi, T., "The JPEG2000 still image coding system: an overview," Consumer Electronics, IEEE Transactions, vol. 46, no. 4, pp. 1103, 1127, November 2000.

[4] "Draft ITU-T recommendation and final draft international standard of joint video specification (ITU-T Rec. H.264/ISO/IEC 14 496-10 AVC," in Joint Video Team (JVT) of ISO/IEC MPEG and ITU-T VCEG, JVT-G050, 2003.

[5] MSU Graphics & Media Lab (Video Group), "Lossless Video Codecs Comparison 2007", 2007, retrieved 2011-12-07.

[6] Burrows, M.; Wheeler, D. J., (1994). "A block sorting lossless data compression algorithm", Technical Report 124, Digital Equipment Corporation.

[7] Bernas, T., Asem, E. K., Robinson, J. P. and Rajwa, B. (2006). "Compression of fluorescence microscopy images based on the signal-to-noise estimation," Microsc. Res. Tech., 69: 1-9. doi: 10.1002/jemt.20259.

[8] Amer, A.; Dubois, E., (2005). "Fast and reliable structure-oriented video noise estimation," Circuits and Systems for Video Technology, IEEE Transactions on, vol. 15, no. 1, pp. 113-118.

[9] Nowak, R. D.; Baraniuk, R. G., (1999). "Wavelet-domain filtering for photon imaging systems," IEEE Transactions on Image Processing, vol. 8, no. 5, pp. 666-678.

[10] Avinash, G. B., (1995). "Image compression and data integrity in confocal microscopy," Scanning, 17. pp. 156-160.

[11] SGGR06. Sheppard C J R, Gan X, Gu M, Roy M. Signal-to-noise ratio in confocal microscopes. In: Pawley J B, editor. Handbook of Biological Confocal Microscopy. Springer; 2006. pp. 442-452.

[12] Stigler, Stephen M. (1989). "Francis Galton's Account of the Invention of Correlation," Statistical Science 4 (2): 73-79.

[13] Otsu, N., (1979). "A threshold selection method from gray-level histograms". IEEE Trans. Sys., Man., Cyber. 9 (1): 62-66.

[14] Serra, J., (1982). "Image Analysis and Mathematical Morphology", ISBN 0-12-637240-3.

[15] Video Spot Tracker: http://cismm.cs.unc.edu/resources/software manuals/video-spot-tracker-manual/.

[16] C. Cortes, V. Vapnik "Support-vector networks". *Machine Learning* 20 (3): 273.doi:10.1007/BF00994018

[17] http://scikitlearn.org/stable/auto_examples/svm/plot_weighted_samples.html

[18] X. Yang, Q. Song and A. Cao "Weighted support vector machine for data classification", Proc. Int. Joint Conf, Neural Networks (IJCNN 2005), pp. 859-864 2005.

What is claimed is:

1. A method for compressing video images, the method comprising:

classifying image pixels in each video frame of a series of video frames as either foreground or background, wherein the series of video frames includes at least three video frames, wherein classifying the image pixels as foreground or background comprises generating a pixel score for each of the image pixels, wherein generating the pixel score for each of the image pixels includes computing Pearson's correlation coefficients between that pixel's pixel intensity value over time and each of its neighbors' pixel intensity values over time and using a function associated with the computed Pearson's correlation coefficients to generate the pixel score, and thresholding on the pixel scores, wherein each pixel with a pixel score that meets or exceeds a threshold value is classified as a foreground pixel and wherein each pixel with a pixel score that is less than the threshold value is classified as a background pixel, wherein computing Pearson's correlation coefficients between that pixel's pixel intensity value over time and each of its neighbors' pixel intensity values over time includes computing $R_i$, where $R_i$ represents a Pearson's correlation coefficient value associated with the pixel's pixel intensity value over time i, wherein $R_i = |E[(x_j - \bar{x})(y_{ij} - \bar{y}_i)]/\sigma_x \sigma_{y_i}|$, where $x_j$ is the pixel intensity value for a center pixel at jth frame, $\bar{x}$ is the mean pixel intensity value for the center pixel, $y_{ij}$ is the pixel intensity value for a neighbor pixel at jth frame; $\bar{y}_i$ is the mean pixel intensity value for the neighbor pixel, $\sigma_x$ is the standard deviation of x, and $\sigma_{y_i}$ is the standard deviation of $y_i$;

replacing, in the video images, each pixel classified as background with a time-averaged value of pixel intensity for that pixel; and compressing the video images containing the replaced pixels using a compression algorithm, wherein the replaced pixels improve a compression rate associated with the compression algorithm.

2. The method of claim 1, further comprising averaging the pixel intensity over time for each pixel classified as background.

3. The method of claim 1, further comprising identifying false positive classifications of pixels classified as foreground using a mathematical morphology erosion operation.

4. The method of claim 1, further comprising extending a region of pixels classified as foreground using a mathematical morphology dilation operation.

5. The method of claim 1, wherein compressing the video images comprises using a lossless compression algorithm.

6. The method of claim 1, wherein classifying the image pixels as foreground or background includes using a sliding-window to define ranges of time in which the classification is performed.

7. The method of claim 1, wherein classifying the image pixels as foreground or background comprises utilizing a normality test method to identify as foreground pixels those with a non-normal intensity distribution over time and to identify as background pixels those with a normal intensity distribution over time.

8. The method of claim 1, wherein classifying the image pixels as foreground or background comprises applying at least one quantile curve to each of the image pixels in each of the video frames of the series of video frames, functionally fitting at least one set of parameters to each of the quantile curves to form at least a part of a feature vector, and implementing principal component analysis to determine which combinations of elements in the feature vector are best suited for classifying the pixels as foreground or background.

9. The method of claim 1, wherein classifying the image pixels as foreground or background comprises utilizing a combination of at least one of the correlation-based method, a normality test method, and a principal component analysis method, and applying confidence intervals to determine which of the methods deserves a highest weight, wherein the weight of each method is estimated by an inverse of a variance.

10. A system for compressing video images, the system comprising:
  at least one processor and memory; and
  a compressor implemented using the at least one processor and memory, the compressor configured to classify image pixels in each video frame of a series of video frames as either foreground or background, wherein the series of video frames includes at least three video frames, wherein classifying the image pixels as foreground or background comprises generating a pixel score for each of the image pixels, wherein generating the pixel score for each of the image pixels includes computing Pearson's correlation coefficients between that pixel's pixel intensity value over time and each of its neighbors' pixel intensity values over time and using a function associated with the computed Pearson's correlation coefficients to generate the pixel score, and thresholding on the pixel scores, wherein each pixel with a pixel score that meets or exceeds a threshold value is classified as a foreground pixel and wherein each pixel with a pixel score that is less than the threshold value is classified as a background pixel, wherein computing Pearson's correlation coefficients between that pixel's pixel intensity value over time and each of its neighbors' pixel intensity values over time includes computing $R_i$, where $R_i$ represents a Pearson's correlation coefficient value associated with the pixel's pixel intensity value over time i, wherein $R_i = |E[(x_j - \bar{x})(y_{ij} - \bar{y}_i)]/\sigma_x \sigma_{y_i}|$, where $x_j$ is the pixel intensity value for a center pixel at jth frame, $\bar{x}$ is the mean pixel intensity value for the center pixel, $y_{ij}$ is the pixel intensity value for a neighbor pixel at jth frame; $\bar{y}_i$ is the mean pixel intensity value for the neighbor pixel, $\sigma_x$ is the standard deviation of x, and $\sigma_{y_i}$ is the standard deviation of $y_i$, to replace, in the video images, each pixel classified as background with a time-averaged value of pixel intensity for that pixel, and to compress the video images containing the replaced pixels using a compression algorithm, wherein the replaced pixels improve a compression rate associated with the compression algorithm.

11. The system of claim 10, wherein the compressor is configured to average the pixel intensity over time for each pixel classified as background.

12. The system of claim 10, wherein the compressor is configured to identify false positive classifications of pixels classified as foreground using a mathematical morphology erosion operation.

13. The system of claim 10, wherein the compressor is configured to extend a region of pixels classified as foreground using a mathematical morphology dilation operation.

14. The system of claim 10, wherein the compressor is configured to use a lossless compression algorithm.

15. The system of claim 10, wherein the compressor is configured to classify the image pixels as foreground or background using a sliding window to define ranges of time in which the classification is performed.

16. The system of claim 10, wherein the compressor is configured to classify the image pixels as foreground or background by utilizing a normality test method to identify as foreground pixels those with a non-normal intensity distribution over time and to identify as background pixels those with a normal intensity distribution over time.

17. The system of claim 10, wherein the compressor is configured to classify the image pixels as foreground or background by applying at least one quantile curve to each of the image pixels in each of the video frames of the series of video frames, functionally fitting at least one set of parameters to each of the quantile curves to form at least a part of a feature vector, and implementing principal component analysis to determine which combinations of elements in the feature vector are best suited for classifying the pixels as foreground or background.

18. The system of claim 10, wherein the compressor is configured to utilize a combination of at least one of the correlation-based method, a normality test method, and a principal component analysis method, and to apply confidence intervals to determine which of the methods deserves a highest weight, wherein the weight of each method is estimated by an inverse of a variance.

19. A non-transitory computer readable medium having stored thereon executable instructions that when executed by a processor of a computer control the computer to perform steps comprising:
  classifying image pixels in each video frame of a series of video frames as either foreground or background, wherein the series of video frames includes at least three video frames, wherein classifying the image pixels as foreground or background comprises generating a pixel score for each of the image pixels, wherein generating the pixel score for each of the image pixels includes computing Pearson's correlation coefficients between that pixel's pixel intensity value over time and each of its neighbors' pixel intensity values over time and using a function associated with the computed Pearson's correlation coefficients to generate the pixel score, and thresholding on the pixel scores, wherein each pixel with a pixel score that meets or exceeds a threshold value is classified as a foreground pixel and wherein each pixel with a pixel score that is less than the threshold value is classified as a background pixel, wherein computing Pearson's correlation coefficients between that pixel's pixel intensity value over time and each of its neighbors' pixel intensity values over time includes computing $R_i$, where $R_i$ represents a Pearson's correlation coefficient value associated with the pixel's pixel intensity value over time i, wherein $R_i = |E[(x_j - \bar{x})(y_{ij} - \bar{y}_i)]/\sigma_x \sigma_{y_i}|$, where $x_j$ is the pixel intensity value for a center pixel at jth frame, $\bar{x}$ is the mean pixel intensity value for the center pixel, $y_{ij}$ is the pixel intensity value for a neighbor pixel at jth frame; $\bar{y}_i$ is the mean pixel intensity value for the neighbor pixel, $\sigma_x$ is the standard deviation of x, and $\sigma_{y_i}$ is the standard deviation of $y_i$;
  replacing, in the video images, each pixel classified as background with a time-averaged value of pixel intensity for that pixel; and
  compressing the video images containing the replaced pixels using a compression algorithm, wherein the replaced pixels improve a compression rate associated with the compression algorithm.

20. The non-transitory computer readable medium of claim 19, wherein compressing the video images comprises using a lossless compression algorithm.

21. The non-transitory computer readable medium of claim 19, wherein classifying the image pixels as foreground or background comprises utilizing a normality test method to identify as foreground pixels those with a non-normal intensity distribution over time and to identify as background pixels those with a normal intensity distribution over time.

22. The non-transitory computer readable medium of claim 19, wherein classifying the image pixels as foreground or background comprises applying at least one quantile curve to each of the image pixels in each of the video frames of the series of video frames, functionally fitting at least one set of parameters to each of the quantile curves to form at least a part of a feature vector, and implementing principal component analysis to determine which combinations of elements in the feature vector are best suited for classifying the pixels as foreground or background.

23. The non-transitory computer readable medium of claim 19, wherein classifying the image pixels as foreground or background comprises utilizing a combination of at least one of the correlation-based method, a normality test method, and a principal component analysis method, and applying confidence intervals to determine which of the methods deserves a highest weight, wherein the weight of each method is estimated by an inverse of a variance.

24. The method of claim 1, wherein using the function associated with the computed Pearson's correlation coefficients includes selecting, from the computed Pearson's correlation coefficients, a Pearson's correlation coefficient having a maximum magnitude.

25. The system of claim 10, wherein using the function associated with the computed Pearson's correlation coefficients includes selecting, from the computed Pearson's correlation coefficients, a Pearson's correlation coefficient having a maximum magnitude.

26. The non-transitory computer readable medium of claim 19, wherein using the function associated with the computed Pearson's correlation coefficients includes selecting, from the computed Pearson's correlation coefficients, a Pearson's correlation coefficient having a maximum magnitude.

* * * * *